United States Patent [19]

Sirkis

[11] Patent Number: 5,367,583
[45] Date of Patent: Nov. 22, 1994

[54] FIBER OPTIC STRESS-CORROSION SENSOR AND SYSTEM

[75] Inventor: James S. Sirkis, Burtonsville, Md.
[73] Assignee: University of Maryland, College Park, Md.
[21] Appl. No.: 194,294
[22] Filed: Feb. 9, 1994
[51] Int. Cl.$^5$ .............................................. G01B 9/02
[52] U.S. Cl. .................................. 385/12; 250/227.19; 250/231.19; 356/352
[58] Field of Search ..................... 385/12, 13; 356/345, 356/352; 250/227.14, 227.19, 227.23, 227.24, 227.25, 227.27, 231.1, 231.19, 230

[56] References Cited

U.S. PATENT DOCUMENTS

| | | | |
|---|---|---|---|
| 4,733,561 | 3/1988 | Gilby | 356/352 X |
| 4,897,542 | 1/1990 | Dakin et al. | 250/231.19 X |
| 5,152,173 | 10/1992 | Willson | 250/231.19 X |
| 5,195,374 | 3/1993 | Parsons et al. | 250/231.19 X |
| 5,202,939 | 4/1993 | Belleville et al. | 385/12 |
| 5,237,630 | 8/1993 | Hogg et al. | 385/12 |
| 5,301,001 | 4/1994 | Murphy et al. | 250/227.27 X |

OTHER PUBLICATIONS

Murphy et al., "Fabry–Perot fiber-optic sensors in full-scale fatigue testing of an F–15 aircraft", Applied Optics vol. 31, No. 4 Feb. 1992, pp. 431–433.

Primary Examiner—John D. Lee
Attorney, Agent, or Firm—Christopher N. Sears

[57] ABSTRACT

This invention pertains to an integral Fabry-Perot stress corrosion, strain and material corrosion sensor and associated system that allows for in-situ monitoring of stress-corrosion, strain and corrosion at a given location of a specimen in real-time. The sensor uses an intrinsic Fabry-Perot cavity with one mirror integrally mounted on the specimen that provides a means for: i) transducing information of stress-corrosion of the specimen; ii) measuring strain of the specimen; and iii) measuring the corrosive environment.

8 Claims, 4 Drawing Sheets

FIBER OPTIC STRESS-CORROSION SENSOR AND SYSTEM

FIELD OF THE INVENTION

This invention pertains to an integral Fabry-Perot stress corrosion, strain and material corrosion sensor and associated system that allows for in-situ monitoring of stress-corrosion, strain and corrosion at a given location of a specimen in real-time. The sensor uses an intrinsic Fabry-Perot cavity with one mirror integrally mounted on the specimen that provides a means for: i) transducing information of stress-corrosion of the specimen; ii) measuring strain of the specimen and iii) measuring the corrosive environment.

BACKGROUND OF THE INVENTION

Fiber optic sensors are popular for use in detecting changes in temperature, pressure and strain. Fiber optic sensors in which the fiber itself acts as the sensor, are of interest in the context of advanced smart structures that use composite materials in combination with metallic components. This is due to the fact that the fiber is generally compatible with both thermoset and thermoplastic composites. This makes the the fiber optic sensor particularly useful when embedded in the composite/metallic material to function as an in-situ measurement device.

In particular, the invention herein can be used in the aircraft industry where failure of aluminum components is a major concern. Current inspection techniques for such failures include manual processes that may involve disassembling parts, thereby removing the plane from service for costly extended time periods. The proposed invention herein solves such a problem by providing an on-line system for remotely monitoring the structural components that operate in a corrosive environment.

Pertinent prior art that uses the Fabry-Perot fiber optical cavity to perform physical measurements of a structural object include U.S. Pat. No. 5,202,939 by Belleville et al. entitled "Fabry-Perot Optical Sensing Device for Measuring a Physical Parameter." This patent teaches of a device that uses an optical fiber Fabry-Perot optical cavity with a Fizeau-interferometer for multimode light transduction of physical parameters such as temperature, pressure and mechanical strain. This teaching requires the use of a halogen-quartz based lamp type light source, not a single mode light source, i.e. a diode laser as in the present invention which effectively allows for corrosion measurements. Moreover, this patent teaches away from using a single mode light transmission optical fiber, which is the only mode used in the present invention. Moreover, this reference does not teach or suggest using the interferometer to measure corrosion.

U.S. Pat. No. 5,237,630 by Hogg et al. entitled "Fiber Optic Device with Reflector Located at Splice Joint" teaches of how to make fiber optic Fabry-Perot strain gauges and system for monitoring along with various ways of making the optical cavity, and how to make a Fabry-Perot reflecting surface. However, this patent does not teach or suggest the means for detecting stress-corrosion or corrosion of a structural specimen as discussed below.

Another teaching of a typical prior art Fabry-Perot strain sensors appears in the article entitled Fabry-Perot fiber optic sensors in full scale testing of the F-15 aircraft by Murphy, *Applied Optics*, January 1992, Vol. 31, No. 4, pages 431–433 deals exclusively with extrinsic measurements of strain and does not teach or suggest using the sensor for corrosion detection.

SUMMARY OF THE INVENTION

The present invention provides an integral Fabry-Perot stress corrosion, strain and material corrosion sensor and associated system that allows for in-situ monitoring of stress-corrosion, strain and corrosion at a location of a structural specimen in real-time. The sensor uses an intrinsic Fabry-Perot cavity with one mirror integrally mounted on the specimen that provides a means for: i) transducing information of stress-corrosion of the specimen; ii) measuring strain of the specimen; and iii) measuring the corrosive environment.

OBJECTS OF THE INVENTION

Accordingly, several objects and advantages of the present invention are:
 (a) To provide a Fabry-Perot stress-corrosion sensor and system that can monitor stress-corrosion, strain and corrosion at a given location of an object under observation at the same time using a single sensor.
 (b) To provide a Fabry-Perot stress-corrosion sensor and system that can monitor the physical condition of metallic structural components designed to operate in corrosive environments.
 (c) To provide a Fabry-Perot stress-corrosion sensor and system that can monitor the physical condition of metallic structural components, and in particular the stress-corrosion of aircraft components for safety reasons.

Still further advantages will become apparent from a consideration of the ensuing detailed description and drawings.

DETAILED DESCRIPTION

Figure 1:
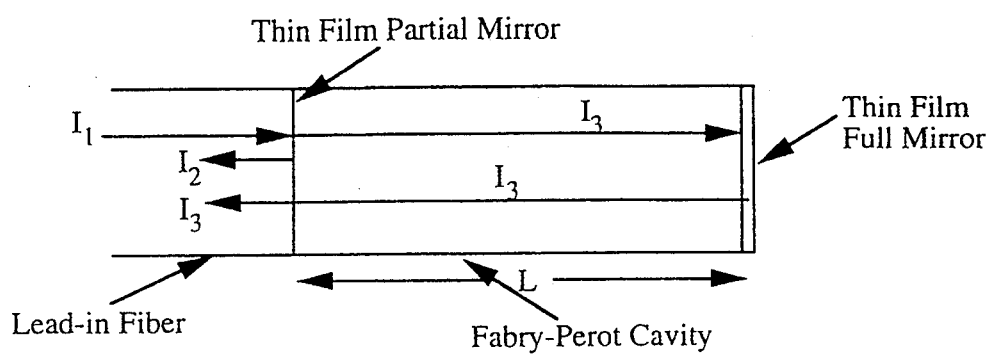
FIG. 1 shows a Fabry-Perot stress-corrosion sensor.

The stress-corrosion sensor as shown in FIG. 1 is capable of monitoring strain and corrosion simultaneously in the system as described below. Stress-corrosion is the reduction in structural strength due to the combined effects of mechanical loading and chemical corrosion. These mechanisms alone can reduce strength, but a combination of mechanical loading and corrosion leads to an accelerated reduction of mechanical strength in a structural entity. The strain and corrosion are measured using mutually exclusive optical phenomenon in an intrinsic Fabry-Perot fiber optic sensor which is known in the optical interferometer arts. The strain is measured by monitoring the optical phase changes created in the all-Fabry-Perot interferometer, and the corrosion is measured by monitoring the reflected intensity from the thin film full mirror used to create the Fabry-Perot cavity. This mirror is fabricated from a metal similar to that of a metallic structural specimen being monitored so that the corrosion rate of the full thin film mirror and the structural specimen are the same.

The Fabry-Perot sensor as shown in FIG. 1 uses light from an external single mode lead-in optical fiber that launches light into the Fabry-Perot cavity of the sensor which is partially reflected, shown as ($I_2$), and transmitted through the cavity, shown as ($I_3$), through a thin film partial mirror that is formed between two cleaved fibers. $I_3$ is then reflected from the thin film full mirror which is part of the structural specimen and is transmitted back through the partial mirror. $I_2$ and $I_3$ optically interfere to produce an intensity function of the form $$I_{out} = A + B \cos(4\pi nL/\lambda); \quad (1)$$

where A and B are constants, n is the refractive index of the cavity, L is the cavity length, and $\lambda$ is the wavelength of the light introduced into the single mode of the optical fiber connected to the sensor. This equation can be simplified to the form:

$$I_{out} = A + B \cos(\phi) \quad (2)$$

where $\phi = 4\pi nL/\lambda$ is the optical phase detected. Since the cavity length, L, and the refractive index, n, are functions of strain, the optical phase can be used to measure the strain in the Fabry-Perot cavity. The optical fiber Fabry-Perot cavity is also used to measure structural strain by bonding or embedding it to the structural specimen where a metallic element is part of the structure. Structures that the sensor is compatible with also includes thermoset and thermoplastic composites and can function as an in-situ measurement device.

Figure 2:
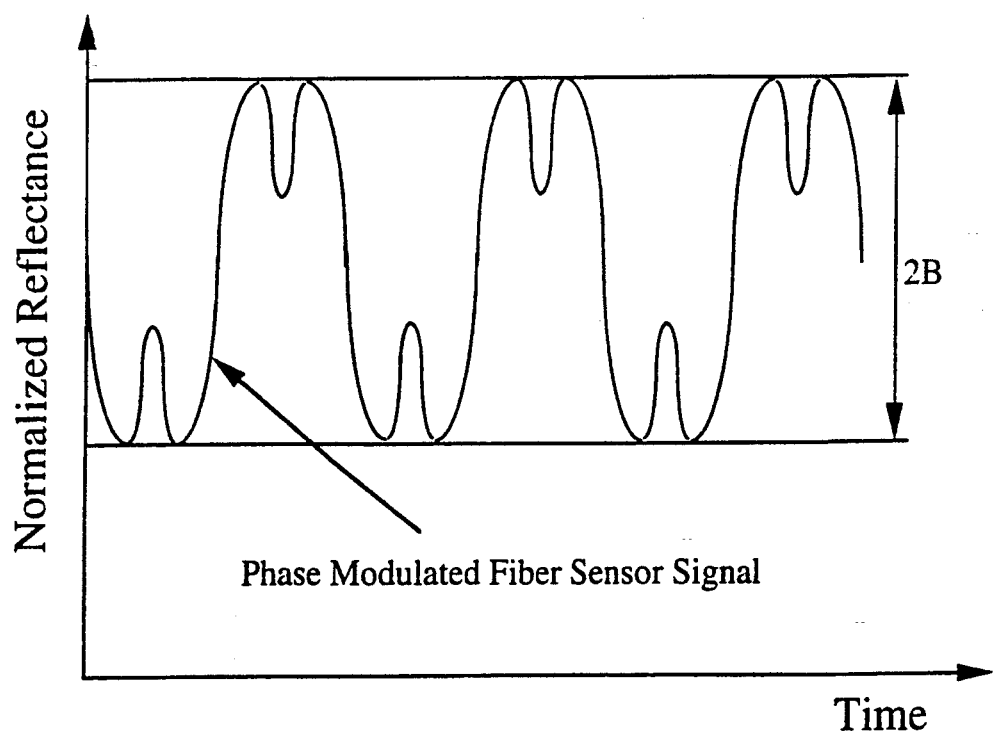
FIG. 2 shows a phase modulated sine wave of a fiber sensor signal to produce an intensity signal to derive structural strain of a specimen with respect to time.

Phase generated carrier based demodulation can be used to extract the phase angle $\phi$, from the intensity $I_{out}$. This technique preferably uses a sine wave modulation of a wavelength $\lambda$, to produce an intensity signal at any instant in time similar to that shown in FIG. 2. The peak-to-peak value, shown as (2B), of this periodic function is governed by the reflectivities of thin film full mirror and thin film partial mirror as shown in FIG. 1.

Figure 3:
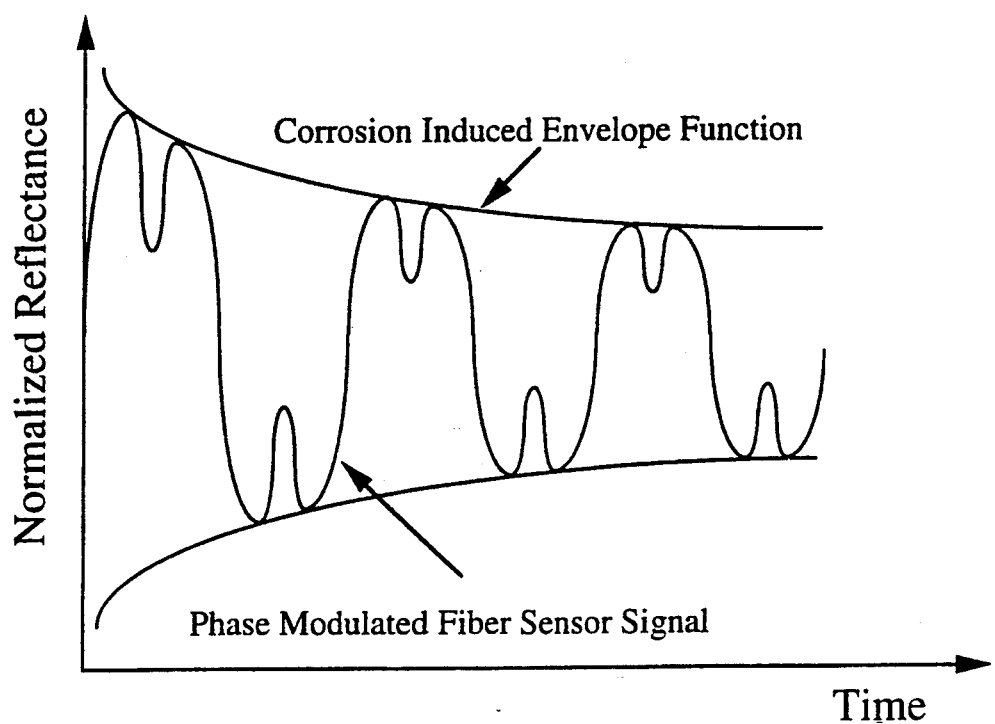
FIG. 3 shows a phase modulated sine wave of a fiber sensor signal to produce an intensity signal to derive structural corrosion of a specimen with respect to time.

When the thin film full mirror of the Fabry-Perot cavity is exposed to a corrosive environment, the reflectivity of that mirror will be diminished with time. This reduced reflectivity and resulting reduction in the peak-to-peak value (2B) as shown in FIG. 3 do not change the actual phase measurements obtained with time, but can be used to measure the corrosion of the thin film full mirror that forms part of the observed structure being monitored.

As corrosion attacks the coating material, its thickness and dielectric properties are altered so as to reduce the reflectivity, i.e. defined as $I_{out}/I_{in}$ of the optical cavity, generally made of glass and the metal interface under observation. Choosing the metallic coating to possess a corrosion rate similar to the materials used to fabricate the structural component enables remote monitoring of corrosion in the structural system. Methods of making the thin film full mirror on the structure is provided by information in U.S. Pat. No. 5,237,630 by Hogg et al. entitled "Fiber Optic Device with Reflector Located at Splice Joint" which is incorporated by reference e.g. the sputtering technique. The Fabry-Perot sensor is surface mounted or adhered to the structural member specimen being sensed.

The actual structural member being sensed with the Fabry-Perot corrosion mirror can be aluminum, aluminum alloys, copper as well as other mettalic materials that exhibit reflective properties. For example, aluminum is a metal resistant to corrosion that justifies its' use in many aircraft components. The higher the purity of aluminum, the better the corrosion resistance becomes. Aluminum resistance to corrosion is due to a thin oxide film that quickly grows to a limiting value on the surface once exposed to oxygen or water contained in air or water. Under normal atmospheric conditions, the oxide is about 5.0 nm thick, but can increase if water vapor is present. Moreover, in a marine atmosphere, corrosion of aluminum is produced by the amount of air-borne salt which when combined with oxygen and moisture provides the electrolytic solution that initiates corrosion. The dominant type of corrosion is pitting or plating out at localized sites of the specimen. The invention can be used in such harsh environments.

The corrosion sensor concept compliments the fatigue sensor in that the transduction mechanism used for corrosion detection is independent of the transduction mechanisms used to detect mechanical loading induced degradation. In brief, the corrosion sensing mechanism is intensity based, and therefore susceptible to noise due to fluctuations in optical source intensity and optical fiber loss mechanisms such as microbending. Source intensity can be independently monitored to eliminate source noise effects. Other optical fiber loss mechanisms can be eliminated because their time dependence is generally traceable to mechanical loading that will therefore occupy a distinct and filterable region of the frequency spectrum.

Figure 4:
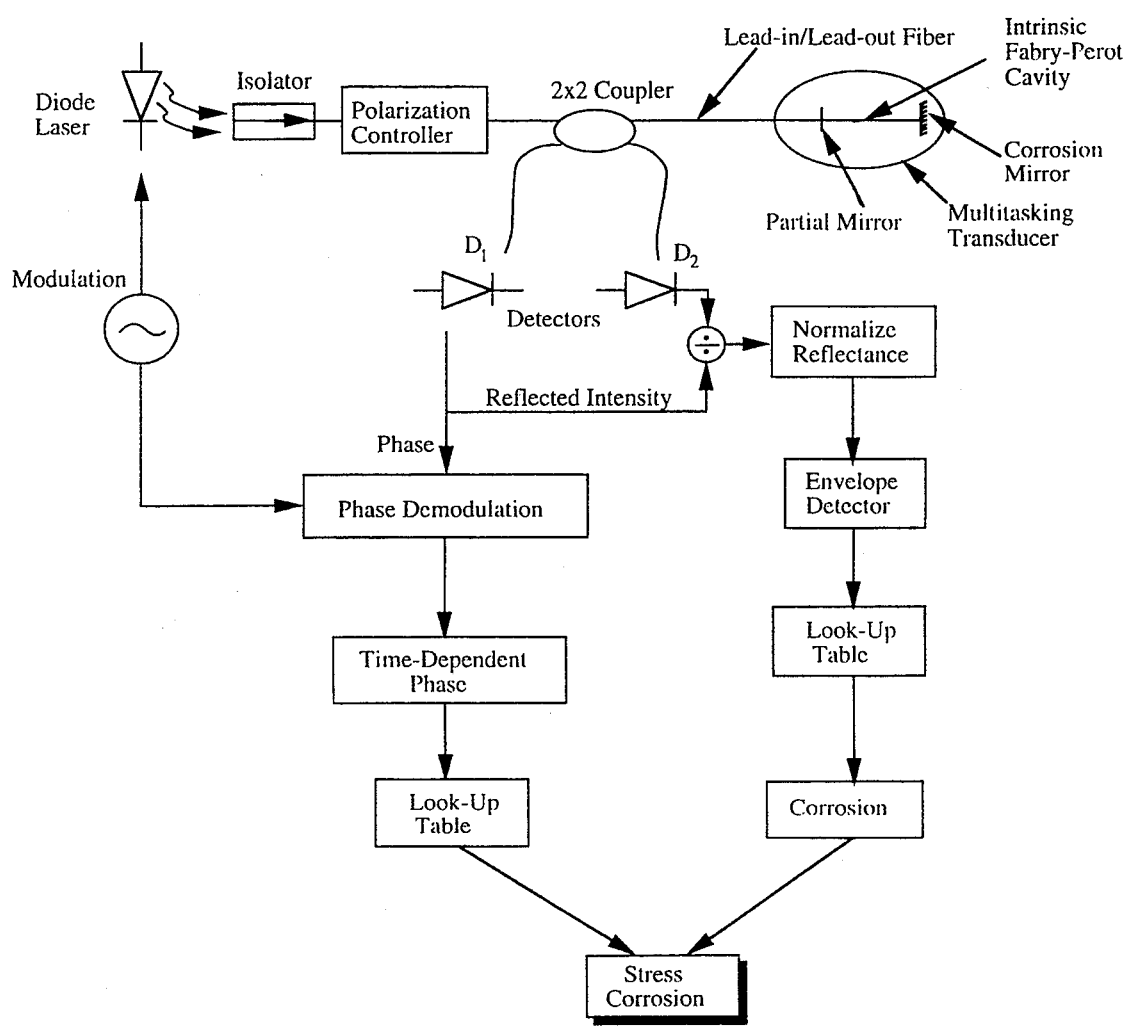
FIG. 4 shows a block diagram of the corrosion sensor and associated system for detecting stress-corrosion, stress and corrosion.

The instrumentation required to delineate the signals associated with each mechanism can be integrated into a single unit using very reliable detection techniques. FIG. 4 shows a preferred system configuration in block form. The components include a temperature controlled diode laser with optical isolator pair to provide a monochromatic light source capable of wavelength modulation. The isolator prevents any reflected light from entering the laser cavity. This light is launched through a polarization controller into one port of a 2×2 coupler which splits the light between the multitasking strain/corrosion sensor formed by the intrinsic Fabry-Perot cavity whose corrosion mirror is integrally mounted on the structural specimen and the photodetector D2. D2 is used to monitor fluctuations in the source intensity for use in noise cancellation in the corrosion sensing task of the sensor. The light entering the lead-in/lead-out fiber reaches the sensor, is modulated by the strain field that is taking place, and is subsequently reflected back to photodetector D1. The sensor takes the form of any lead insensitive intrinsic Fabry-Perot optical fiber sensor. The signal from D1 is normalized by D2 and an envelope detector is used to extract the normalized back-reflected intensity at any instant in time as depicted in FIG. 3. The normalized reflected intensity is then processed through an experimentally developed look-up table to convert intensity to corrosion for outputting to a proper output means for indication or display of stress-corrosion as shown in FIG. 4 of the specimens existing state. The optical configuration shown in FIG. 4 can be fabricated with standard optical fiber components or use high birefringent optical fibers for the Fabry-Perot sensor and optical fiber means to the sensor.

The signal recorded by D1 in FIG. 4 is also tapped-off to the phase demodulation electronic means such as serrodyne as taught by Jackson et al. in Pseuodoheterodyne Detection Scheme for Optical Interferometry, in *Elect. Letters,* 18, pp. 1274–78, 1982 or a Homodyne demodulation technique as taught by Danbridge et al. in Homodyne demodulation Scheme for Fiber Optic Sensors Using Phase Generated Carriers, in *IEEE Journal Quantum Electronics,* QE-18(10), pp. 1647–53, 1982 which provides the phase history of the structural specimen. The phase history exiting the demodulation electronic means is directly dependent on the indigenous strain history of the structural specimen. These signals can be processed with a microprocessor based calibration look-up tables for example by providing the state of fatigue of the structural specimen and reveal the remaining fatigue life. This allows for monitoring the physical condition of metallic structural components designed to operate in corrosive environments, and in particular alert maintenance personnel of the stress-corrosion of aircraft components as to the safety thereof.

The look-up table shown in FIG. 4 can be incorporated in a microprocessor or be incorporated in a central processing unit of a monitored structural entity. The look-up table is determined by subjecting the Fabry-Perot sensor to a series of tests in which the load history and the corrosive enviromment are changed. The resulting time to failure and the intensity-corrosion calibration curves for each combination of load and corrosive environment are recorded and used in the look-up tables for the apparatus. This set of data is material-specific and is used for comparing actual Fabry-Perot sensor data to estimate the remaining life of the structural component.

Figure 5:
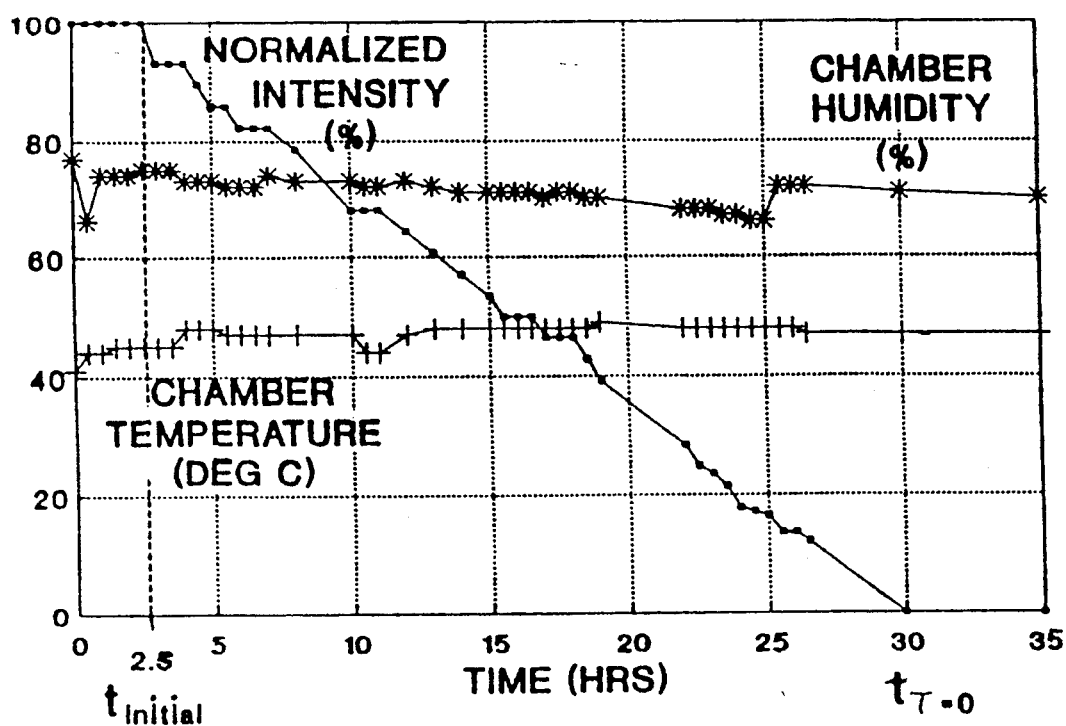
FIG. 5 shows an example of experimental data that relates reflectivity as a function of time that establishes the corrosion environment data for a look-up table for the stress-corrosion apparatus. This data can also be used to develop the look-up table for this apparatus.
Figure 6:
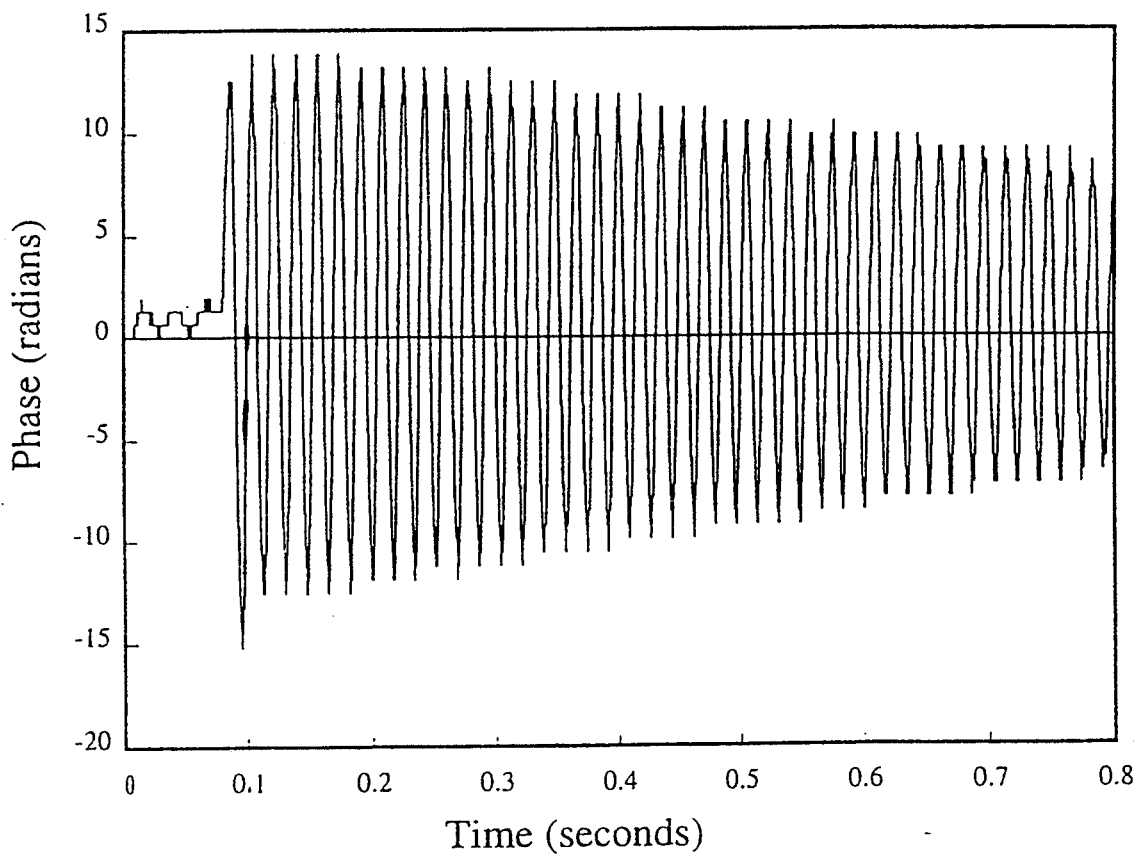
FIG. 6 shows the Fabry-Perot sensor response to damped vibration of a cantilever beam over a short time to provide strain information for the look-up table.

FIG. 5 shows an example of experimental data that relates reflectivity as a function of time that establishes required corrosion input data for the stress-corrosion look-up table for the apparatus shown in FIG. 4. The reflectivity data is a function of time under relatively constant temperature, humidity and salinity. For example, this data is found by placing an unstrained Fabry-Perot sensor in an environmental chamber with a temperature of 45+/−5° C. and a humidity of approximately 72%. This data shows the relationship between the metal reflectivity of the Fabry-Perot sensor and the length of exposure to a corrosive environments. FIG. 6 shows the Fabry-Perot sensor response to damped vibration of an experimental cantilever beam which provides information of the strain induced properties of the material during a very short time period that is used for data incorporated with the look-up table.

Although the description above contains many specificities, these should not be construed as limiting the scope of this invention but as merely providing illustrations of some of the presently preferred embodiments of this invention.

I claim:

1. A fiber optical based stress-corrosion, strain and corrosion sensor and associated system for monitoring stress-corrosion, strain and corrosion of a structural specimen comprising:
    a modulated laser light source;
    light transmitting means for communicating the laser light source with an intrinsic Fabry-Perot interferometer that is attached to the structural specimen;
    a dual photodetection and signal processing means for determining phase angle shift and reflected intensity of the modulated laser light source, the dual photodetection means provides a signal for: i) phase angle shift which corresponds to strain induced in the structural specimen and ii) a normalized reflectance which corresponds to corrosion of the structural specimen; and
    an outputting means for outputting a signal that corresponds with stress-corrosion, strain and corrosion of the structural specimen.

2. The fiber optical based stress-corrosion, strain and corrosion sensor and associated system of claim 1 wherein the intrinsic Fabry-Perot interferometer includes two semi-reflective mirrors that are spaced by a given distance so as to define a Fabry-Perot cavity having transmittance and reflectance properties which are affected by the stress and corrosion of the specimen which cause optical properties of the modulated laser light source to vary in response to the stress and corrosion which the specimen is subjected to, one of the semi-reflective mirrors is made of the same material as the structural specimen.

3. The fiber optical based stress-corrosion, strain and corrosion sensor and associated system of claim 1 wherein the dual photodetection and signal processing means for determining phase angle shift and reflected intensity of the modulated laser light source includes:
    a means for phase demodulation that electronically resolves time dependent phase angle shift; and
    an envelope detection means for electronically determining the normalized reflectance which is a signal that corresponds with a predetermined corrosion state of the structural specimen.

4. The fiber optical based stress-corrosion, strain and corrosion sensor and associated system of claim 3 wherein the means for phase demodulation is a means for heterodyne demodulation.

5. The fiber optical based stress-corrosion, strain and corrosion sensor and associated system of claim 3 wherein the means for phase demodulation is a means for homodyne demodulation.

6. A fiber optical based strain and corrosion sensor for monitoring a structural condition of a structural specimen comprising:
    a lead-in optical fiber means for introducing light into the sensor; and
    an intrinsic Fabry-Perot interferometer which includes two semi-reflective mirrors that are spaced by a given distance and made of a solid fiber optical material so as to define a Fabry-Perot cavity having transmittance and reflectance properties which are affected by the stress and corrosion of the specimen which cause optical properties of a modulated light source to vary in response to the stress and corrosion which the specimen is subjected to, one of the semi-reflective mirrors is part of the surface of the structural specimen and made of the same material for corrosion measurements of the structural specimen in real-time.

7. The sensor of claim 6 the lead-in optical fiber means for introducing light into the sensor and the intrinsic Fabry-Perot interferometer are made from high-birefringent optical fiber material.

8. The sensor of claim 6 wherein the semi-reflective mirror that is part of the surface of the structural specimen and made of the same material is selected from the group consisting of aluminum and aluminum alloys.

* * * * *